United States Patent [19]

Yamada

[11] 4,072,961
[45] Feb. 7, 1978

[54] LIGHT MEASURING CIRCUIT FOR AUTOMATIC EXPOSURE CONTROL

[75] Inventor: Seiji Yamada, Sakai, Japan

[73] Assignee: Minolta Camera Kabushiki Kaisha, Osaka, Japan

[21] Appl. No.: 711,919

[22] Filed: Aug. 5, 1976

[30] Foreign Application Priority Data

Aug. 6, 1975 Japan .............................. 50-96088

[51] Int. Cl.² ............................................. G03B 7/08
[52] U.S. Cl. ....................................... 354/24; 354/31; 354/51; 354/60 R
[58] Field of Search .................... 354/23 R, 24, 31, 50, 354/51, 60 R, 60 F; 356/162, 209, 212

[56] References Cited

U.S. PATENT DOCUMENTS

| | | | |
|---|---|---|---|
| 3,730,063 | 5/1973 | Kobayashi et al. | 354/31 |
| 3,842,424 | 10/1974 | Tsunekawa et al. | 354/31 |
| 3,864,699 | 2/1975 | Tsunekawa et al. | 354/31 |
| 3,994,001 | 11/1976 | Maitani et al. | 354/23 R |

*Primary Examiner*—Russell E. Adams
*Attorney, Agent, or Firm*—Watson, Cole, Grindle & Watson

[57] ABSTRACT

Light measuring circuit for camera automatic exposure control measures scene light passing through the objective and reflected at the film surface and/or the shutter curtain surface located at the exposre aperture of the camera. The measuring circuit is provided with a compensating circuit for compensating the light responsive output for the difference of light reflecting power of the surfaces of the film and the shutter curtain. The compensating circuit is actuated in a predetermined timing relationship with the travel of a shutter curtain.

7 Claims, 2 Drawing Figures

LIGHT MEASURING CIRCUIT FOR AUTOMATIC EXPOSURE CONTROL

BACKGROUND OF THE INVENTION

The present invention relates to a light measuring circuit adapted to be used in an automatic exposure time control device for a photographic camera, and more particularly pertains to the light measuring circuit which means scene light passing through an objective and reflected at the film surface and/or the surface of the shutter curtain or blade located at the exposure aperture of the camera.

In general, a film surface located at an exposure aperture of a focal plane shutter camera is covered with a shutter curtain or blade before exposure is initiated, and after the shutter is released to open, the film surface is uncovered gradually, with the area of film surface to be exposed to scene light increasing gradually to the full area. Thus, if one desires to measure scene light through an image of the object scene projected on the film surface at the exposure aperture, he must take account of the reflecting power of the shutter curtain or blade, the because exposure time must be counted from the moment of shutter initiation when the film surface is fully covered.

There is proposed in U.S. Pat. No. 3,687,026 a camera exposure time control device which has the light measuring system as mentioned above and in which the surface of the shutter curtain has a reflecting power between 23-31%, and preferably 27%. According to the U.S. Patent, the reflecting powers most of films available in the market have reflecting powers within a narrow range as mentioned above, and if the reflecting power of the shutter curtain is selected within that range, then exposure error due to the difference of the reflecting power of the surfaces of film and shutter curtain is negligible in substance. However, a noticeable error may occur in such proposed device for the film having a reflecting power near the outer limits of the range. Further, if the reflecting power of films is greatly changed from that of films now on market, the light measuring device or camera designed to be adapted to the present films will not be able to be used any longer. In addition, such limitation with respect to the reflecting power of the shutter curtain will restrict the design flexibility of the camera, because one may desire to select low reflecting power for avoiding flare of light due to reflection of light at the interior of camera body, or another may desire high reflecting power to allow as much light as possible to impinge on a light receiving element.

Moreover, a Japanese laid-open-patent specification No. 50-86342 which, was published on July 11, 1975, discloses an exposure control device having first and second light integrating capacitors connected in series with each other to a light measuring circuit. The first capacitor is started to be charged upon initiation of shutter opening, while the second is started to be charged when the leading shutter curtain has traveled a predetermined distance or amount, so that compensation may be made for the difference of reflecting power of the surfaces of film and the shutter curtain while the shutter is operating. However, this disclosed device has the partial disadvantage that the capacitance of the second capacitor must be changed for each film having a different reflecting power accordingly, the device should be provided with a plurality of capacitors which will increase the volume or space where the device is arranged. However, it is difficult to obtain a variable capacitor suitable for use in such a control device as usually is incorporated in a camera.

SUMMARY OF THE INVENTION

Therefore, the primary object of the present invention is to provide a light measuring circuit for automatic exposure time control, wherein the output is thereof compensated for the difference in reflecting power of the surfaces of the film and the shutter curtain or blade, but which obviates the disadvantage as mentioned above as to the prior art.

Another object of the present invention is to provide a light measuring circuit in which the compensation for the difference of reflecting power is made by an element other than a capacitor.

Still another object of the present invention is to provide a light measuring circuit in which the output of the circuit is automatically compensated for the difference of reflecting powers with the reflecting power of the film being input beforehand.

According to the present invention, a compensating circuit generates an output as a function of the reflecting power of the film surface and the output is input to the light measuring circuit in timed relationship with the operation of the curtain or blade of a focal plane shutter.

According to a preferred embodiment of the present invention, the output of the compensating circuit is input to a bias circuit for a photoelectric circuit so that the voltage of the bias circuit may be controlled by the output of the compensating circuit. In this case, the compensating circuit may be connected to the bias circuit through a semiconductor switch which is controlled by a RC delay circuit.

DETAILED DESCRIPTION OF THE PREFERRED EMBODIMENT

Construction

Figure 1:
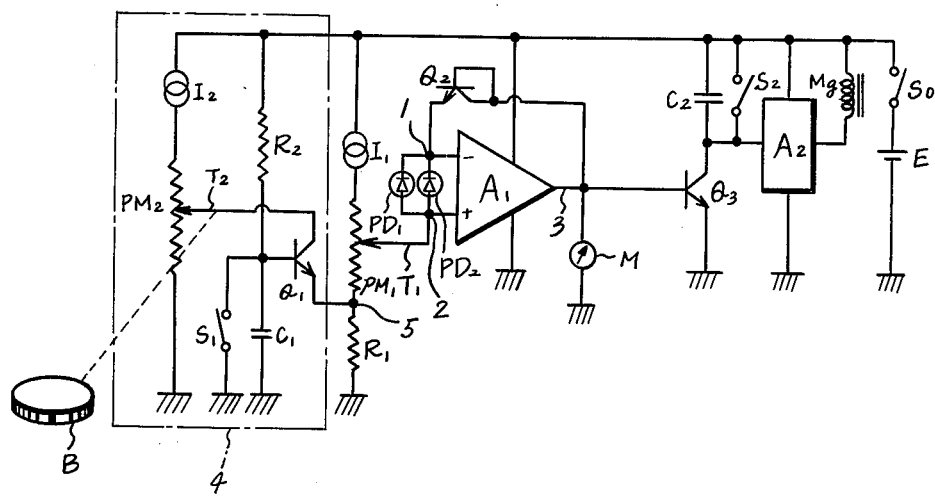
FIG. 1 is a circuit diagram showing an automatic exposure control circuit including a preferred embodiment of the present invention.
Figure 2:
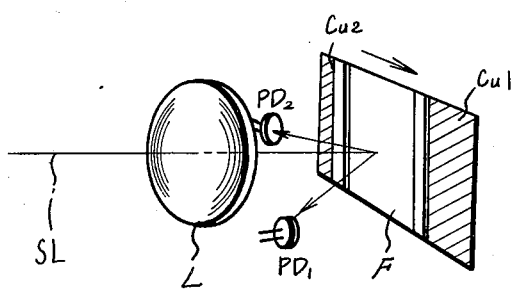
FIG. 2 is a diagramatic perspective view showing an arrangement of photodiodes.

Referring now to the FIGS. 1 and 2, a pair of photodiodes PD1 and PD2 are disposed in a camera body (not shown) to receive scene light SL passing through an objective lens L and reflected at film surface and/or leading shutter curtain Cul of a focal plane shutter. In other words, the pair of photodiodes PD1, PD2 measure the brightness of a an image of scene to be photographed projected on a focal plane by the objective lens L. In such an arrangement the surface of the shutter curtain which faces the objective has a predetermined reflecting power which may not be within the range as defined in the U.S. Pat. No. 3,687,025. However the other structure disclosed in the U.S. Patent may be employed in the embodiment of the present invention. The trailing curtain may not have a surface with a reflecting power as does the leading curtain but preferably have a surface with as low a reflecting power as possible, because the light reflected by the surface of the trailing curtain does not contribute to the exposure control.

The pair of photodiodes PD1, PD2 are connected in parallel with each other between a pair of input terminals 1, 2 of a differential amplifier A1 the output of which is fed back to one of the input terminals through a transistor Q2, the collector of which is connected with its base to operate as a diode, so that the output of the differential amplifier A1 is proportional to the logarithm of light intensity detected by the diodes. The other input terminal 2 is connected to a slider arm or movable contact T1 of a potentiometer PM1 which is adjustable in accordance with the film sensitivity. The potentiometer PM1 is connected in series with a fixed resistor R1 and constant current generating circuit I1. Another potentiometer PM2, connected serially in series with another constant current generating circuit I2, is adjustable by a dial B in accordance with the reflecting power of the film. The movable contact T2 of the potentiometer PM2 is connected to the junction point between potentiometer PM1 and fixed resistor R1 through a bi-directional, bi-polar transistor Q1, base of which is connected between a fixed resistor R2 and a capacitor C1 so that the transistor Q1 is made conductive after a predetermined time period from the opening of switch S1 connected across the capacitor C1. The switch S1 is associated with the camera shutter mechanisms to be opened in response to initiation of the shutter opening, and the value of the capacitor C1 and the resistor R2 is so determined that the transistor Q1 turns on when the leading shutter curtain has traveled a predetermined amount, i.e. when the film is uncovered to a predetermined extent.

To the output 3 of the differential amplifier A1 are connected an anmeter M and a base of a transistor Q3 which generates at its collector an output current proportional to the anti-logarithm of the voltage applied to its base. In other words, the transistor Q1 logarithmically expands the signal that is logarithmically compressed by the transistor Q2. Capacitor C2 is connected to the collector of the transistor Q3 to be charged with the output current of the transistor Q3. Switch S3, connected across the capacitor C2, is opened in response to the initiation of shutter opening, preferably in synchronization with the switch S1. An electromagnet Mg is connected to an output terminal of a transistor switching circuit A2, input terminal of which is connected to the capacitor C2 so that the transistor switching circuit turns off and shutter closing is initiated by deenergization of the electromagnet Mg when the capacitor C2 is charged to a predetermined level. Power switch S0 is connected to a power source E and closed in conjunction relation with shutter release operation.

Operation

Assume that the embodiment of the present invention as mentioned above is incorporated in a single lens reflex camera. When a reflex mirror (not shown) swings from its viewing position up to its picture taking position the outside of photographic light path, scene light which has passed through the objective lens L is reflected by the surface of leading curtain Cul and impinges on the photodiodes PD1 and PD2, which in turn generate photo-current. The potentiometer has previously been adjusted in accordance with the film sensitivity as mentioned before. Consequently, to the base of the transistor Q3 is applied a voltage equal to the sum of the voltage at the movable contact of the potentiometer PM1 and the voltage proportional to the antilogarithm of light intensity detected by the photodiodes PD1 and PD2.

After the reflex mirror has moved from the photographic light path, the leading curtain Cul is released so that the film is uncovered with the travel of the leading curtain. Thus the scene light is reflected partially by the uncovered film surface and partially by the surface of the leading curtain still covering part of film. Switches S1 and S2 are opened in conjunction with the start of the leading curtain so that charging of both capacitors C1 and C2 is commenced. At this point, if the scene light is so high that the trailing curtain Cu2 is released before the film is fully uncovered, the shutter is closed before the transistor Q1 is turned on. In this case, the exposure time is controlled without any compensation for the difference of reflecting power, because the light reflected by the film surface does not contribute very much to the exposure control and the difference in the reflecting power is neglegible.

However, if the scene light is low, the embodiment operates as follows. When the leading shutter curtain travels for a predetermined amount and a considerably large portion of film surface is uncovered, the capacitor C1 is charged to a predetermined level to turn on the transistor Q1. At this stage, if the reflecting power of the film surface set by the dial B is equal to that of the surface of the shutter curtain, then the potential at the movable contact T2 of the potentiometer PM2 is equal to the potential at the junction point 5 and there occurs no change in the light measuring circuit. If the set reflecting power of the film surface is larger than that of the surface of the leading shutter curtain, the potential at the movable contact T2 is smaller than that at the point 5 so that the potential at the point 5 is lowered to the level of the movable contact T2 by the current flow from the point 5 to the movable contact T2 through the transistor Q1, and vice versa if the reflecting power of the film surface is smaller than that of leading curtain surface. In this case, the bi-polar bi-directional transistor Q1 permits current flow therethrough in both directions. A field effect transistor may be employed in place of the transistor Q1.

Thus the output of the light measuring circuit occurring at the base of the transistor Q3 is maintained constant irrespective of the position of the leading curtain and the difference of the reflecting power between the film surface and the surface of the leading shutter curtain, so long as scene brightness does not change.

When the reflecting power of the film surface is not known beforehand, the potentiometer PM2 may be adjusted as follows. At the outset, after the single lens reflex camera is loaded with a film with unknown reflecting power and the shutter is cocked, the reflex camera is brought to picture taking position by manipulation of the manual mirror moving mechanism without being accompanied by shutter operation, so that scene light impinges on the leading curtain which fully covers the film. At this time, the output of the light measuring circuit is representative of the scene light reflected by the surface of the leading shutter curtain and the anmeter M indicates the output. After such output is read on the ammeter, the shutter is released with the exposure time, i.e. shutter speed set to bulb exposure manually, so that the surface of the film located at the exposure aperture of the camera is fully uncovered and maintained at that condition. Then the potentiometer PM2 is adjusted until the indication of meter M, representative of the scene light measured from the film surface becomes equal to the indication of meter M previously read with the film fully covered by the leading curtain. Thus the position of the movable contact T2 of the potentiometer PM2 is determined in accordance with the reflecting power of the surface of the film loaded in the camera. In this case, the light source to be measured for the adjustment of potentiometer PM2 is not necessary to be a standard light source but may be an ordinary photographic scene or object so long as its luminance or brightness does not substantially change during the adjustment.

In the embodiment as mentioned above, the transistor is turned on when a considerably large portion of the film surface is uncovered. However, such timing is not essential to the present invention, but other timing may be possible. For example, the transistor may turn on when the leading curtain travels half the way, or two thirds of its total path.

Further, the compensation also may not necessarily be made in the biasing circuit for the photoelectric circuit (PD1, PD2 and A1), but may be made between the photoelectric circuit and the logarithmic expansion transistor or other portion of the circuit. In addition, it is to be noted that when the transistor turns on, its output does not change instantly from zero to a saturated level but such change is gradual, and that the same can be said for transistor Q1. Such a transition characteristic of the transistor is favourable for the compensation circuitry of the present invention.

As many apparently widely different embodiments of this invention may be made without departing from the spirit and scope thereof, it is to be understood that the invention is not limited to the specific embodiments thereof except as defined in the appended claims.

I claim:

1. In an automatic exposure control circuit including a focal plane shutter member opened to initiate exposure and closed to terminate the exposure, an integrating capacitor for timing closing of the focal plane shutter member, a light measuring circuit having at least one photocell for measuring scene light passing through the camera objective and reflected by the film surface and/or the surface of the shutter member located at the focal plane of the camera objective, the combination comprising:

first means for generating photoelectric current representative of light incident on said at least one photocell;

second means for amplifying said photoelectric current and having an amplification factor commensurate with the reflection factor of the film surface, said first and second means being coupled with said integrating capacitor to charge the latter with the respective currents generated thereby;

third means for actuating said first means in response to opening of said shutter member; and fourth means for actuating said second means when said shutter member has been opened to a predetermined extent.

2. The combination as claimed in claim 1 wherein said first means includes a logarithmic compression circuit for generating a first voltage proportional to the logarithm of light intensity incident on said at least one photocell and a logarithmic expansion circuit for generating a current proportional to the anti-logarithm of said first voltage, and said second means includes means for generating a second voltage commensurate with the reflection factor of said film surface, and means for applying to said logarithm expansion circuit a voltage equal to the sum of said first and second voltages so that the output current of said expansion circuit is proportional to the anti-logarithm of the sum of said first and second voltages.

3. The combination as claimed in claim 1 wherein said second means includes manually settable means for setting a reflection factor, said manually settable means being connected in said second means to adjust said amplification factor in accordance with the manual setting thereof.

4. In an automatic exposure control circuit including an integrating capacitor for timing closing of a focal plane shutter, and a light measuring circuit for measuring scene light passing through the camera objective and reflected by the film surface and/or the shutter member surface located at the focal plane, the combination comprising:

means for generating an electric current commensurate with the light measurement to charge said integrating capacitor;

means for presetting a compensation factor in accordance with the reflecting power of the film surface;

means for adjusting said electric current in accordance with said compensation factor;

means for selectively connecting said adjusting means to said means for generating; and timing means for actuating said selective means in timed relationship with operation of the shutter member.

5. A combination as in claim 4 wherein said light measuring means includes a photoelectric circuit for generating light responsive voltage and a biasing circuit for biasing the photoelectric circuit, and said means for adjusting is connectable to the biasing circuit to control the bias voltage thereof.

6. A combination as in claim 5, wherein said means for selectively connecting includes a semiconductor switch actuated by said timing means, said timing means having a time constant to make the switch conductive after a predetermined amount of shutter member movement.

7. A combination as in claim 4, wherein said adjusting means includes a manually variable resistor.

* * * * *